United States Patent [19]
Iida et al.

[11] 3,742,016
[45] June 26, 1973

[54] PRODUCTION AND PURIFICATION OF ACETONE CYANOHYDRIN BY MULTIPLE STAGE DISTILLATION AND CONDENSATION STEPS

[75] Inventors: Yasunobu Iida; Hideki Kaio, both of Yokohama; Masashi Ikeda, Tokyo-to; Yasumasa Yamamoto, Yokohama, all of Japan

[73] Assignees: Nitto Kagaku Kogyo Kabushiki Kaisha (a/k/a Nitto Chemical Industry Co., Ltd.); Mitsubishi Rayon Kabushiki Kaisha (a/k/a Mitsubishi Rayon Co., Ltd.), Tokyo-to, Japan; part interest to each

[22] Filed: Oct. 20, 1970

[21] Appl. No.: 82,321

[30] Foreign Application Priority Data
Oct. 21, 1969 Japan.............................. 44/84029

[52] U.S. Cl.................. 260/465.6, 203/34, 203/42, 203/77, 203/80, 203/87, 203/88
[51] Int. Cl........................................ C07c 121/36
[58] Field of Search ................... 203/29, 42, 62, 80, 203/71, 73, 88, 87, 74, 77; 260/465.6; 202/183, 154, 153

[56] References Cited
UNITED STATES PATENTS

| | | | |
|---|---|---|---|
| 3,573,173 | 3/1971 | Otsuka et al.......................... | 203/88 |
| 3,580,819 | 5/1971 | Hoory et al........................... | 203/80 |
| 2,731,490 | 1/1956 | Barsky................................. | 260/465.6 |
| 3,544,268 | 12/1970 | Hess.................................... | 260/465.6 |
| 2,826,601 | 3/1958 | Barsky................................ | 260/465.6 |
| 2,748,154 | 5/1956 | Journeay............................. | 260/465.6 |

OTHER PUBLICATIONS

"Acrylates and Methacrylate," Salkind et al., Industrial and Engineering Chem., Vol. 51, No. 10, Oct. 1959, pg. 1234–1236.

*Primary Examiner*—Wilbur L. Bascomb, Jr.
*Attorney*—Robert E. Burns and Emmanuel J. Lobato

[57] ABSTRACT

Crude acetone cyanohydrin synthesized in a synthesis step from hydrocyanic acid and acetone in the presence of an alkaline catalyst and containing unreacted hydrocyanic acid and acetone is subjected, after neutralization of the alkaline catalyst, to a purification process which comprises: subjecting the crude acetone cyanohydrin to a first distillation step in which a flash distillation is carried out at a relative mild vacuum thereby to remove a first distillate composed principally of hydrocyanic acid and impurities of lower boiling points; subjecting substances not distilled in the first flash distillation to a second distillation a relatively higher temperature and a mild vacuum thereby to remove a second distillate composed principally of acetone; and recovering the substances not distilled in the second distillation as a purified acetone cyanohydrin. This purification process is characterized in that: the hydrocyanic acid and any accompanying acetone are recovered from the first distillate and are recirculated to the synthesis step; at least one portion of the acetone of the second distillate is caused to contact crude acetone cyanohydrin containing the alkaline catalyst thereby to cause absorption thereof; and the resulting absorption liquid is recirculated to the synthesis step.

7 Claims, 1 Drawing Figure

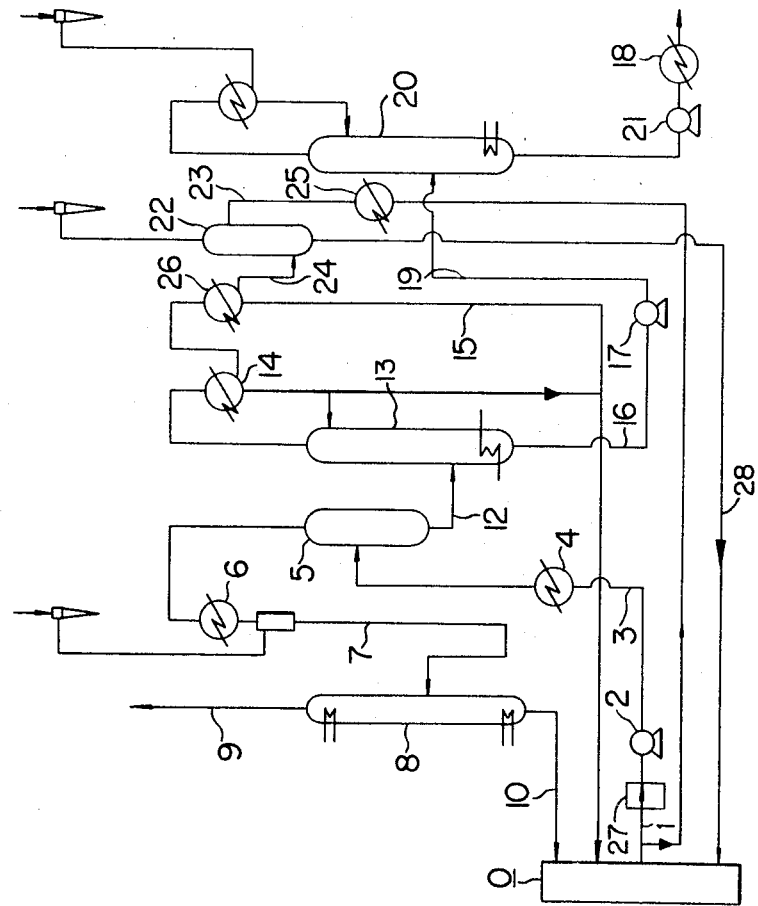

PRODUCTION AND PURIFICATION OF ACETONE CYANOHYDRIN BY MULTIPLE STAGE DISTILLATION AND CONDENSATION STEPS

BACKGROUND OF THE INVENTION

This invention relates generally to production of purified acetone cyanohydrin (known also as α-hydroxyisobutyronitrile) of high purity.

More specifically, the invention relates to a new and advance process for producing acetone cyanohydrin $(CH_3)_2C(OH)CN$ of high purity from crude acetone cyanohydrin synthesized, in the presence of an alkaline catalyst, from acetone and hydrocyanic acid (prussic acid) or hydrocyanic acid containing substances such as acidic gases such as sulfur dioxide, nitrogen monoxide, nitrogen dioxide, carbon dioxide, and hydrogen sulfide and lower hydrocarbons such as methane.

In general, acetone cyanohydrin is produced by an addition reaction of hydrocyanic acid and acetone in the presence of an alkaline catalyst. Acetone cyanohydrin produced in this manner, in most instances, contains small quantities of unreacted hydrocyanic acid and acetone and, moreover, contains also impurities (acidic gases, low-boiling-point impurities, etc.) which were present in the hydrocyanic acid. Consequently, crude or impure acetone cyanohydrin of this character requires purification.

Among the known methods for purifying acetone cyanohydrin by removing, from crude or impure acetone cyanohydrin prepared in the above described manner, acid gases and low-boiling point impurities detrimental to this reaction and recovering unreacted acetone and hydrocyanic acid, the most important methods practiced at present are as follows.

1. Crude acetone cyanohydrin is prepared by using the hydrocyanic acid from coke-oven gas (5 to 7 percent hydrocyanic acid, 70 to 80 percent hydrogen sulfide, 10 to 15 percent carbon dioxide gas, and 5 percent of other substances such as nitrogen). An alkaline catalyst is supplied into acetone in a quantity greater than that of the hydrogen sulfide and carbon dioxide which are detrimental to the reaction and acetone cyanohydrin is prepared by counter-current contact of the acetone with the coke-oven gas in a first column.

The hydrogen sulfide gas and carbon dioxide gas containing acetone from the top of the column are condensed, and the noncondensible gases, that is, a portion of the hydrogen sulfide, carbon dioxide gas and acetone is introduced into a second washing column, where unabsorbed gases are discharged from the top of the column. The condensed liquid is recirculated to the reaction system.

After neutralization, the unpurified acetone cyanohydrin containing acetone and water, that is the bottom liquid of the synthesis process, is introduced into a distillation column at atmospheric pressure, where acetone and a portion of the water is separated out. With respect to the bottom liquid, the remaining water is separated out in a succeeding tower for distillation under reduced pressure, and then, in a final tower for distillation under reduced pressure, acetone cyanohydrin and the distillation residue are separated. (One reference: Erdöl und Kohle 14, 1961, pp. 1018 – 1021.)

2. The fact that the boiling points of acetone and hydrocyanic acid are much lower than that of the product, acetone cyanohydrin, is utilized by causing acetone and hydrocyanic acid to evaporate by reduced-pressure distillation and separating the acetone cyanohydrin as a bottom liquid. The hydrocyanic acid and acetone, which are vaporized, are cooled and condensed by brine and recirculated to the reaction process. (Two references: Oil and Gas Journal 20, 1966, pp. 187–188; and Ind. Eng. Chem. 51, 1959, pp.1236 – 1238.)

3. Hydrocyanic acid is synthesized by using ammonia, natural gas (methane), and air as feeds and a catalyst such as platinum. A gas containing this hydrocyanic acid (6.5 percent hydrocyanic acid, 2.2 percent ammonia, 22.2 percent water, 0.5 percent carbon dioxide gas, 0.1 percent oxygen, 3.8 percent carbon monoxide, 7.3 percent hydrogen, 1.5 percent methane, and 55.3 percent nitrogen) is used to synthesize acetone cyanohydrin. (One reference: Specification of German Pat. No. 1,257,765.)

4. Crude acetone cyanohydrin reaction liquid is neutralized and then caused to travel in a stream of an inert gas (e.g., nitrogen) as the temperature of the liquid is maintained at 60° C. The resulting gas is washed with water to recover unreacted hydrocyanic acid and thereby to increase the yield of the acetone cyanohydrin. (One reference: Japanese Pat. Publication No. 11965/1961.)

5. Crude acetone cyanohydrin reaction liquid is neutralized and then subjected to aeration thereinto or to heating under reduced pressure thereby to remove unreacted acetone and hydrocyanic acid. (One reference: Japanese Patent Publication No. 522/1959.)

6. A portion of purified acetone cyanohydrin is recirculated to absorb unreacted hydrocyanic acid gas escaping from the reaction zone and then recirculated for recovery to the distillation zone. (One reference: Japanese Pat. Publication No. 5755/1960.)

While these methods all have respective merits in achieving their respective objects, various problems still remain, as far as we are aware, with respect to each of these methods when considered from an industrial point of view. Major examples of these problems are as follows.

Method 1).

1-1. Hydrogen sulfide and carbon dioxide which are detrimental to the synthesis, exist in a dissolved state in acetone and, without being completely separated out, are recirculated together with the acetone to the reaction system. In the reaction system, these acidic substances kill the alkali supplied as catalyst, whereby the reaction velocity is greatly reduced, and the normal reaction is impaired. The solubilities of hydrogen sulfide and carbon dioxide in acetone are quite high, being, respectively, 22.4 grams/liter and 12.53 grams/liter at 20° C temperature and 760-mm.Hg pressure.

1-2. For this reason, a large quantity of the alkaline catalyst (added in the form of an aqueous solution) must be supplied in order to cause the reaction to proceed normally. As a result, the water content increases, whereby the decomposition of the acetone cyanohydrin in the purification process is promoted, and, at the same time, the load imposed on the water-separation column is increased.

1-3. Since a large quantity of the alkaline catalyst is used for the synthesis of the acetone cyanohydrin, the quantity of the salt produced by the neutralization thereof becomes large.

1-4. The process of removing the salt thus produced is effected in the separation from the acetone cyanohydrin in the final tower for distillation under reduced pressure. Consequently, the acetone cyanohydrin is heated and distilled in the presence of this salt, whereby the quantity of acetone cyanohydrin decomposed increases. Furthermore, the presence of the salt tends to cause trouble in operation and disadvantage in heat economy.

1-5. The hydrogen sulfide reacts with the alkaline catalyst to form an alkaline metal sulfide, which migrates to the purification process and is caused to undergo hydrolysis by the large quantity of water, whereby it severely corrodes the structural materials with which it comes into contact.

Method 2)

2-1. Since acidic materials and low-boiling-point impurities contained in the feeds accompany the mixture of hydrocyanic acid and acetone, the above described difficulties accompanying the excessive consumption of the alkaline catalyst are encountered when the mixture is recirculated directly without treatment to the reaction system.

2-2. In general, acetone cyanohydrin is used principally in the production of methyl methacrylate, for which an acetone cyanohydrin of high purity is required. Furthermore, acetone cyanohydrin readily decomposes during purification into hydrocyanic acid and acetone. In addition, the boiling points of hydrocyanic acid, acetone, and acetone cyanohydrin at atmospheric pressure are 25.6, 56.3, and approximately 210° C, respectively, which represent an extremely wide spread or difference in boiling points.

In order to recover hydrocyanic acid and acetone completely with the first column under these restrictive conditions, the process for condensing the hydrocyanic acid and the acetone necessarily becomes a low-vacuum distillation because of their low boiling points.

One the other hand, since acetone cyanohydrin has a high boiling point, the temperature of the column bottom is raised in order to produce acetone cyanohydrin of high purity. However, since this would cause a rapid decomposition of the acetone cyanohydrin, the distillation is carried out under a high vacuum. Therefore, since this condition conflicts with the above described conditions, an industrial operation of the process is accompanied by difficulties.

2-3. The hydrocyanic acid and acetone formed by decomposition within the column are supplied together with acetone cyanohydrin to a second column, from the top of which the hydrocyanic acid and acetone, together with water, are distilled out and, after passing through the vacuum-producing equipment, are discharged out of the system, thereby becoming a loss.

2-4. In order to prevent decomposition of the acetone cyanohydrin in the first column, distillation under a high vacuum must be used. But then condensation and recovery of hydrocyanic acid and acetone become impossible with an ordinary coolant, and, the losses of hydrocyanic acid and acetone become excessive. Furthermore, a large diameter distillation column becomes necessary, which is uneconomical.

2-5. Even if a coolant at a very low temperature could be used, there would still be the possibility of freezing within the condenser since the freezing points of hydrocyanic acid and acetone cyanohydrin are -13° C and -19° C, respectively. In actual practice, threfore, this method cannot be utilized on an commercial basis.

Method 3)

3-1. Since a large quantity of water is contained in the system, not only is the reaction velocity reduced drastically, but the decomposition of the acetone cyanohydrin in the purification process is promoted, and, at the same time, the load imposed on the tower for water separation is increased.

3-2. Since a large quantity of inert gases is used, unreacted acetone and hydrocyanic acid are swept along with these inert gases, whereby the losses of acetone and hydrocyanic acid are extremely large.

Methods 4) and 5)

4,5-1. Because of the relationship of their partial pressures with that of the inert gases, hydrocyanic acid and acetone are swept along by the inert gases, whereby the loss of hydrocyanic acid and acetone is excessive.

4,5-2. Particularly when a large quantity of nitrogen is used, the process is generally uneconomical, although the economy depends on the nitrogen cost.

Method 6)

6-1. This method is extremely disadvantageous in thermal economy since it involves the steps of cooling and recirculating a large quantity of purified acetone cyanohydrin, passing the same through the reaction zone after its absorption of hydrocyanic acid and acetone, and then heating and distilling the same in the distillation zone.

6-2. Because of the salt crystallized by neutralization, there arises the possibility of increase in operational trouble and defects.

6-3. Furthermore, since this method is practiced with a distillation zone operated under atmospheric pressure, the acetone cyanohydrin tends to decompose and be discolored, whereby it is difficult to consider this method as being desirable on the point of quality of the product acetone cyanohydrin.

SUMMARY OF THE INVENTION

It is an object of the present invention to provide solutions to the above described problems. That is, an object of the invention is to provide a process and apparatus for producing acetone cyanohydrin in which the above described difficulties are totally or substantially overcome. We have found that this object of the invention can be achieved by a novel and logical organization of a plurality of process steps.

According to the present invention, briefly summarized, there is provided a process and apparatus for purifying crude acetone cyanohydrin of the aforementioned character, the principal features of which method are removing, with high efficiency, acidic gases and low-boiling-point impurities detrimental to the main reaction; recovering, with high yield, unreacted hydrocyanic acid and acetone preventing decomposition of the acetone cyanohydrin and polymerization loss of hydrocyanic acid, and causing all or a part of the volatile matters from the top of a distillation column under reduced pressure to undergo counter-current contact with crude acetone cyanohydrin containing an alkaline catalyst thereby to cause absorption and reaction between the thus adsorbed hydrocyanic acid and acetone, whereby an acetone cyanohydrin of high boiling point is obtained, the loss of the effective materials, hydrocyanic acid and acetone being lessened, these substances being effiiently recovered and recirculated to the reaction system, for example, whereby an acetone cyanohydrin of high purity is economically produced.

The nature, principle, and utility of the invention will be more clearly apparent from the following detailed description beginning with general considerations and concluding with a specific example of practice constituting a preferred embodiment of the invention when read in conjunction with the accompanying drawing.

BRIEF DESCRIPTION OF THE DRAWING

In the drawing, the single FIGURE is a flow chart indicating an examplary process and associated apparatus for purification steps suitable for practice of the present invention.

DETAILED DESCRIPTION

As summarized hereinbefore, in the separation process of the invention acid gases, hydrocyanic acid, and acetone, which are the three principal impurities, the first two impurities (the acidic gases and HCN) are first separated by flash distillation, and then the third impurity (acetone) is distilled at a relatively high temperature and low degree of pressure reduction (low vacuum), which conditions were hitherto not considered to a great extent because of the instability with respect to high temperature of acetone cyanohydrin. At the same time, the distillates obtained from the various distillations are advantageously recovered. Accordingly, the present invention affords a technique having the following advantageous features.

1. To remove acidic gases and low-boiling-point impurities from acetone cyanohydrin containing hydrocyanic acid, flash distillation is carried out at a relatively low vacuum thereby to distill out almost all of the acidic gases and hydrocyanic acid together with only small quantities of acetone and acetone cyanohydrin. These distillates can be readily condensed with an ordinary coolant commonly used for low-vacuum distillation.

2. Separation of acidic gases and low-boiling-point impurities from distilled hydrocyanic acid and acetone can be easily accomplished by means of a desorption column of the form of a distillation tower.

3. At least one portion of the top gas in the distillation column (it being possible to recover a portion in the condenser) is caused to undergo counter-current contact in the absorption reaction column with crude acetone cyanohydrin containing an alkaline catalyst thereby to cause this portion of the top gas to be absorbed and to react. Accordingly, complete recovery of the available reactant materials becomes possible (afording an increase in the yield and a decrease in the unit cost), and the problem of environmental pollution can be simultaneously solved.

4. Since the distillation in which distilling off of acetone is the principal purpose is carried out at a relative high temperature and, therefore, at a relatively high pressure, the above mentioned absorption reaction can be accomplished with even greater effectiveness.

5. Since acidic gases are selectively removed in the flash column (and the desorption column), the corrosion resistance of the purification system is increased. The use of hydrocyanic acid containing acidic gases is, of course, not detrimental.

The process, per se, of synthesizing the acetone cyanohydrin according to the invention is known in the art and can be practiced, in general, with a mol ratio of hydrocyanic acid to acetone of from 0.98 to 1.2, at a temperature of from −10° to 50° C, and with the use of an alkaline catalyst such as an alkaline hydroxide. The ordinary procedure upon completion of the synthesizing reaction comprises neutralizing the alkaline catalyst used with an acid such as sulfuric acid or phosphoric acid, removing the salt formed, and subjecting the product to any further purification process.

The first step of the purification process according to the invention is the removal of hydrocyanic acid (and impurities of lower boiling points) by the first distillation, that is to a flash distillation. The term "flash distillation" is herein used in the ordinary sense. That is, for example, this term designates a mode of distillation wherein a solution of a certain composition heated under a certain pressure is injected into a chamber maintained at a pressure lower than the original pressure of the liquid thereby to cause an instantaneous evaporation of lighter components of the solution.

We have found that the conditions under which the invention can be practiced, in general, are: a column interior pressure of from 200 mm. Hg (absolute) to atmospheric pressure; a temperature below 140° C; and a mean residence time of less than 30 minutes. With a degree of pressure reduction of this order, condensation of hydrocyanic acid (and accompanying acetone) by the use of an ordinary coolant is possible. Particularly in the case where heat exchange by the wetted-wall method, in which acetone cyanohydrin flows down along a heated wall surface, is resorted to, the residence time of the acetone cyanohydrin in the heating zone is greatly reduced, whereby thermal decomposition is also decreased.

By condensing the distillate (first distillate) obtained the flash distillation, hydrocyanic acid and accompanying acetone can be recovered. In the case where this first distillate contains acidic gases and (or) low-boiling-point impurities, the condensation is carried out partially or selectively to cause condensation of only the hydrocyanic acid and acetone or, alternatively, full condensation is carried out. Then the condensate is supplied to a gas desorption column, where any undesirable substances such as the acidic gases are evaporated off. This gas desorption column may be of the ordinary distillation tower type which is operated under atmospheric or higher pressure.

The expression "recovery of hydrocyanic acid and accompanying acetone from the first distillate" and others to the same effect as herein setforth mean the obtaining of hydrocyanic acid and acetone in a state wherein they contain substantially no impurities, such as acidic gases, irrespective of whether or not an operation for removal of these impurities is carried out as in the above described manner.

The hydrocyanic acid and acetone recovered in this manner is circulated to the aforementioned synthesizing process either directly or after accumulation and storage for a time.

The crude acetone cyanohydrin after removal of most of the hydrocyanic acid by the flash distillation is next subjected to a second distillation to distill out the acetone. This second distillation is carried out under the conditions where the temperature of heating zone is from 100° to 160° C and the residence time of the acetone cyanohydrin at the heating zone is less than 30 minutes. This temperature and residence time parameter is so selected that the decomposition rate of the acetone cyanohydrin will be less than 0.5 percent.

The temperature denoted by T (degrees K), residence time denoted by $\theta$ (minutes), and decomposition velocity constant denoted by K (percent/minute) have the following relationships.

$$\log K = 14.365 - 6519.1/T$$

$$K\theta < 0.5$$

In accordance with the invention, the preferable conditions for the second distillation are a residence time of the acetone cyanohydrin at the heating zone of less than 10 minutes, particularly less than 2 minutes, and a decomposition rate ($K\theta$) of less than 0.2 percent, particularly less than 0.1 percent. For shortening the residence time, the use, as the heating zone, of a heat exchanger of the wetted-wall type in which the acetone cyanohydrin flows down along a heated wall surface is desirable.

Since the distillation is carried out at a relatively high temperature, the distillation pressure is relatively high (for example, 100 mm. Hg, absolute). As a result, the condensation of the acetone thus distilled out can be carried out with an ordinary condensing device.

The second distillate produced by the second distillation, after partial condensation depending on the necessity, is subjected to an absorption process step using crude acetone cyanohydrin containing the alkaline catalyst. For this crude acetone cyanohydrin for absorption, the liquid within the system taken after the synthesis process step and before the catalyst neutralization step can be used.

Since this absorbent contains an alkaline catalyst, the absorbed hydrocyanic acid and acetone will react and form acetone cyanohydrin. Accordingly, absorption of higher effectiveness than in the case where purified acetone cyanohydrin is used as an absorbent can be carried out.

We have found that the conditions suitable for this absorption are an absorbent-supply temperature of from −25° to +20° C, preferably from −20° to 0° C, and an absorption pressure of from 50 to 400 mm. Hg, absolute, preferably from 100 to 250 mm Hg, absolute.

This absorption can be carried out by any process mode suitable for gas absorption as, for example, by counter-current contact. Furthermore, this absorption operation can be carried out by the use of an independent device for this purpose (in which case a device of the same construction as an ordinary gas-absorption tower may be used) or by any other suitable means.

The absorption liquid thus obtained from the absorption device is substantially the same as the crude acetone cyanohydrin containing the alkaline catalyst. This liquid is then recirculated to the alkaline catalyst neutralization stage or to a stage therefore as, for example, the synthesis process stage.

The acetone cyanohydrin obtained as an undistilled substance in the aforementioned second distillation is purified acetone cyanohydrin in the sense that hydrocyanic acid and acetone (as well as low-boiling-point impurities such as acidic gases) have been removed therefrom. However, it is also possible to further improve the purity of this purified acetone cyanohydrin by dehydration by a measure such as further distillation. Further distillation for dehydration may be carried out under reduced pressure of the order of from 10 to 100 mm. Hg, absolute.

The invention will now be described in detail with respect to one example of the process for purifying acetone cyanohydrin according to the invention as indicated in the accompanying drawing. After synthesis, in the presence of an alkaline catalyst in a synthesis reactor 0. The reactants are led to catalyst neutralizer 27 where the alkaline catalyst is neutralized by acid and any thus formed salt is precipitated. The resulting crude acetone cyanohydrin is supplied through a pipe line 1, a pump 2, a pipe line 3, and a preheater 4 to a flash column 5. From the top of this column 5, acidic gases, low-boiling-point impurities, hydrocyanic acid, acetone, and a small quantity of acetone cyanohydrin are distilled out and condensed in a condenser 6.

The liquid thus condensed is supplied through a pipe line 7 to a desorption column 8. From the top of this column 8, acidic gases and low-boiling-point substances detrimental to the reaction are discharged through a pipe line 9, and hydrocyanic acid and acetone which do not contain these detrimental impurities are recovered from the bottom of the column 8 and recirculated through a pipe line 10 to the synthesis reactor 0.

The bottom liquid of the flash column 5, that is, acetone cyanohydrin containing small quantities of hydrocyanic acid and acetone, is supplied through a pipe line 12 to a distillation column 13. From the top of this column 13, the remaining hydrocyanic acid, acetone, and small quantity of acetone canohydrin are distilled out and condensed in a condenser 14. One portion of the resulting condensed liquid is recirculated to the distillation column 13, while another portion is returned through a pipe line 15 to the synthesis reactor 0.

Uncondensed gases, that is, hydrocyanic acid and acetone, in the condenser 14 are supplied through a heat exchanger 26 and a pipe line 24 to an absorption column 22 and caused to undergo counter-current contact with crude acetone cyanohydrin containing an alkaline catalyst and supplied through a heat exchanger 25 and a pipe line 23, and thereby to accomplish absorption and reaction. Liquid from the bottom of the absorption column 22 is returned to the synthesis reactor 0 via pipeline 28.

Depending on the necessity, the bottom liquid of the distillation column 13 is taken out through a pipe 16 and supplied by a pump 17 through a pipe line 19 to a dehydrating column 20, from the top of which water is distilled out. The bottom liquid of this column 20 is pumped by a pump 21 through a cooler 18 and recovered as purified acetone cyanohydrin of high purity.

In the case where acidic gases and low-boiling-point impurities are not contained in the hydrocyanic acid constituting a starting material for acetone cyanohydrin, the distillate liquid from the flash column 5 can be condensed in the condenser 6, and the condensate can then be directly returned to the synthesis reactor 0.

In order to indicate still more fully the nature and utility of the invention, the following example of practice constituting a preferred embodiment of the invention and results are set forth, it being understood that this example is presented as illustrative only and that it is not intended to limit the scope of the invention. The example is set forth with reference to the accompanying drawing. All quantities in percent are by weight.

EXAMPLE

Crude acetone cyanohydrin synthesized from hydrocyanic acid and acetone, more specifically, a liquid containing 3.4 percent of hydrocyanic acid, 2.66 percent of acetone, 0.29 percent of water, 0.017 percent of sulfur dioxide, and 93.6 percent of acetone cyanohydrin, was passed through preheater 4 and supplied to flash column 5 at a flowrate of 131 kg./hour. Flash column 5 was operated under a vacuum of 450 mm. Hg and at a temperature of 110° C.

From the top of column 5, 5.4 kg. of a distillate liquid was obtained and was found to be composed of 0.40 percent of sulfur dioxide, 54.4 percent of hydrocyanic acid, 14.2 percent of acetone, 1.1 percent of water, and 29.5 percent of acetone cyanohydrin. 97 percent of the sulfur dioxide in the supplied liquid was distilled out, and 66 percent of the hydrocyanic acid was distilled out. This distillate liquid was supplied to desorption column 8, from the top of which sulfur dioxide was discharged. The distillate liquid from the bottom of column 8 was returned to the synthesis reactor 0.

86 percent of the sulfur dioxide supplied to desorption column 8 was discharged from the top thereof, accompanied by 0.5 percent of hydrocyanic acid and 0.04 percent of acetone. Since these quantities of the hydrocyanic acid and acetone were extremely small, it may be considered that it was possible to discharge the sulfur dioxide out of the system in a substantially selective manner.

The liquid from the bottom of flash column 5, which contained an almost negligible quantity of sulfur dioxide, was composed of 1.2 percent of hydrocyanic acid, 2.2 percent of acetone, 0.26 percent of water, and 96.4 percent of acetone cyanohydrin. This liquid was supplied directly into distillation column 13, which was operated at a pressure of 100 mm. Hg, absolute. As a reboiler, a wetted-wall type heat exchanger was used and maintained at 120° C by steam heating.

The liquid from the reboiler was cooled to 80° C and obtained as purified acetone cyanohydrin at a rate of 120 kg/hour. This purified acetone cyanohydrin was found to be composed of 0.03 percent of hydrocyanic acid, 0.2 percent of acetone, 0.2 percent of water, and 99.4 percent of acetone cyanohydrin.

The gas from the top of distillation column 13 was partially condensed in partial condenser 14, and the condensate was returned to the top of distillation column 13. The uncondensed gas in partial condenser 14 was conducted to total condenser 26 and there cooled to a temperature of from −5° to −10° C to be almost totally condensed. The condensate of the total condenser was returned to the synthesis reactor 0. The composition of this total condensate was 30.1 percent hydrocyanic acid, 60.7 percent acetone, 8.5 percent acetone cyanohydrin, and 0.7 percent water.

A minute quantity of a gas which was not condensed in total condenser 26 was conducted to absorption column 22 and there caused to undergo counter-current contact with a crude acetone cyanohydrin reaction liquid containing an alkaline catalyst and supplied at a temperature of from −5° to −10° C and at a flowrate of 20 kg/hour. The uncondensed gas was thus absorbed and caused to react and was then discharged into a vacuum exhaust system. The hydrocyanic acid and acetone thus exhausted into the exhaust system were of negligible quantities.

The bottom liquid of distillation column 13 was conducted to dehydration column 20, which was operated at a pressure of 10 mm.Hg, absolute, and a temperature of 40° C. The bottom liquid of this column 20 was cooled and recovered as a product acetone cyanohydrin of high purity. The purity was found to be of a very high value of 99.7 percent.

We claim

1. A process for producing acetone cyanohydrin of high purity which comprises the steps of:
    a. synthesizing acetone cyanohydrin from hydrocyanic acid and acetone in the presence of an alkaline catalyst;
    b. withdrawing the synthesis mixture resulting from step (a), neutralizing with acid said alkaline catalyst present, and removing the thus formed salt, to leave a residue of crude acetone cyanohydrin;
    c. subjecting said crude acetone cyanohydrin to a flash distillation stage;
    d. withdrawing from said flash distillation an overhead vapor consisting pricipally of hydrocyanic acid in admixture with acetone, acetone cyanohydrin, water and impurities of lower boiling points than hydrocyanic acid, condensing said overhead vapor, and introducing the condensed vapor to a gas desorption stage;
    e. removing from said gas desorption stage an overhead vapor consisting principally of impurities of lower boiling points than hydrocyanic acid, and introducing the liquid bottoms of said gas desorption stage to step (a);
    f. withdrawing the liquid from the bottom of said flash distillation stage and introducing said liquid to a second distillation stage where said liquid is subjected to distillation at a temperature of from 100° to 160°C at the heating zone of said stage, a residence time of said liquid at said heating zone of less than 30 minutes, thereby resulting in a total decomposition of the acetone cyanohydrin of less than 0.5 percent;
    g. withdrawing from said second distillation stage an overhead vapor consisting principally of acetone in admixture with hydrocyanic acid, acetone cyanohydrin and water, and introducing said overhead vapor to a first condenser, while recovering a thus purified acetone cyanohydrin from the bottom of said second distillation stage;
    h. recirculating a portion of the condensed vapor obtained at said first condenser to the top of said second distillation stage, and recirculating the remaining condensed vapor to step (a);
    i. introducing to a second condenser any uncondensed vapor, consisting pricipally of acetone in admixture with hydrocyanic acid, acetone cyanohydrin and water, obtained at said first condenser;
    j. recirculating the vapor condensed at said second condenser to step (a), and introducing any still uncondensed vapor to a lower section of a counter-current absorption stage;
    k. introducing the synthesis mixture from step (a) to the top of said absorption stage, and recirculating the liquid withdrawn from the bottom of said absorption stage to step (a).

2. A process for producing acetone cyanohydrin according to claim 1 in which said first distillation is a flash distillation carried out by a wetted-wall heat exchange technique.

3. A process for producing acetone cyanohydrin according to claim 1 in which said first distillation is carried out under the conditions of a pressure of from 200 mm. Hg, absolute, to atmospheric pressure, a temperature below 140° C, and a mean residence time in the step of less than 30 minutes.

4. A process for producing acetone cyanohydrin according to claim 1 in which said second distillation is carried out under the conditions of a residence time of acetone cyanohydrin at said heating zone of less than 10 minutes and a decomposition rate of acetone cyanohydrin of less than 0.2 percent.

5. A process for producing acetone cyanohydrin according to claim 1 in which the temperature of said crude acetone cyanohydrin containing an alkaline catalyst and contacted by at least one portion of said second distillate is from −25° to +20° C.

6. A process for producing acetone cyanohydrin according to claim 1 in which the temperature of said crude acetone cyanohydrin containing an alkaline catalyst and contacted by at least one portion of said second distillate is from −20° to 0° C.

7. A process as claimed in claim 1, in which the recovered purified acetone cyanohydrin, withdrawn from the bottom of said second distillation stage at step (g) is further introduced to a dehydration stage whereby a further purified acetone cyanohydrin is recovered from the bottom of said dehydration stage.

* * * * *